United States Patent [19]

Baram

[11] 4,077,499
[45] Mar. 7, 1978

[54] DISC BRAKE ACTUATOR

[76] Inventor: Martin Baram, 13 Svanholmvej 2660, Brøndby Strand, Denmark

[21] Appl. No.: 749,210

[22] Filed: Dec. 9, 1976

[30] Foreign Application Priority Data

Dec. 10, 1975 Denmark .............................. 5591/75

[51] Int. Cl.² .......................................... F16D 55/228
[52] U.S. Cl. .................................. 188/72.4; 188/72.5; 188/264 A; 188/264 D; 188/370
[58] Field of Search ................. 188/72.4, 72.5, 250 G, 188/291 M, 264 A, 264 AA, 264 CC, 264 D, 345, 366, 367, 368, 369, 370

[56] References Cited

U.S. PATENT DOCUMENTS

| 2,163,034 | 6/1939 | Gosling et al. ................... 188/366 |
| 2,303,041 | 11/1942 | Glacy ................................. 188/366 |
| 2,417,856 | 3/1947 | Barish ............................... 188/72.4 |
| 2,728,420 | 12/1955 | Wright et al. ..................... 188/370 |
| 2,775,323 | 12/1956 | English ............................ 188/251 M |
| 2,799,367 | 7/1957 | Dotto ................................ 188/370 |
| 3,666,059 | 5/1972 | Thompson ......................... 188/369 |
| 3,675,743 | 7/1972 | Thompson ......................... 188/370 |
| 3,851,567 | 12/1974 | Thompson ......................... 188/370 |
| 3,941,219 | 3/1976 | Myers ............................. 188/264 D |

FOREIGN PATENT DOCUMENTS

| 79,829 | 12/1962 | France ........................... 188/264 CC |
| 1,412,045 | 8/1965 | France ............................... 188/370 |
| 778,336 | 7/1957 | United Kingdom .......... 188/264 CC |
| 1,360,598 | 7/1974 | United Kingdom ................. 188/72.5 |

Primary Examiner—Trygve M. Blix
Assistant Examiner—Douglas C. Butler
Attorney, Agent, or Firm—Hubbell, Cohen, Stiefel & Gross

[57] ABSTRACT

A disc brake which includes a disc mounted on a rotating shaft and a fixed clamp which carries brake elements which may be moved to and from the disc by controlled pneumatic or hydraulic pressure agents. The brake elements are in contact with a pressure head which may be soldered, welded or glued to one end of a self-supporting spring pipe which is directly connected to the clamp at the opposite end of the pipe by way of a suitable flange. The spring pipe forms the final link between the pressure system and the brake elements.

8 Claims, 2 Drawing Figures

U.S. Patent  March 7, 1978  4,077,499
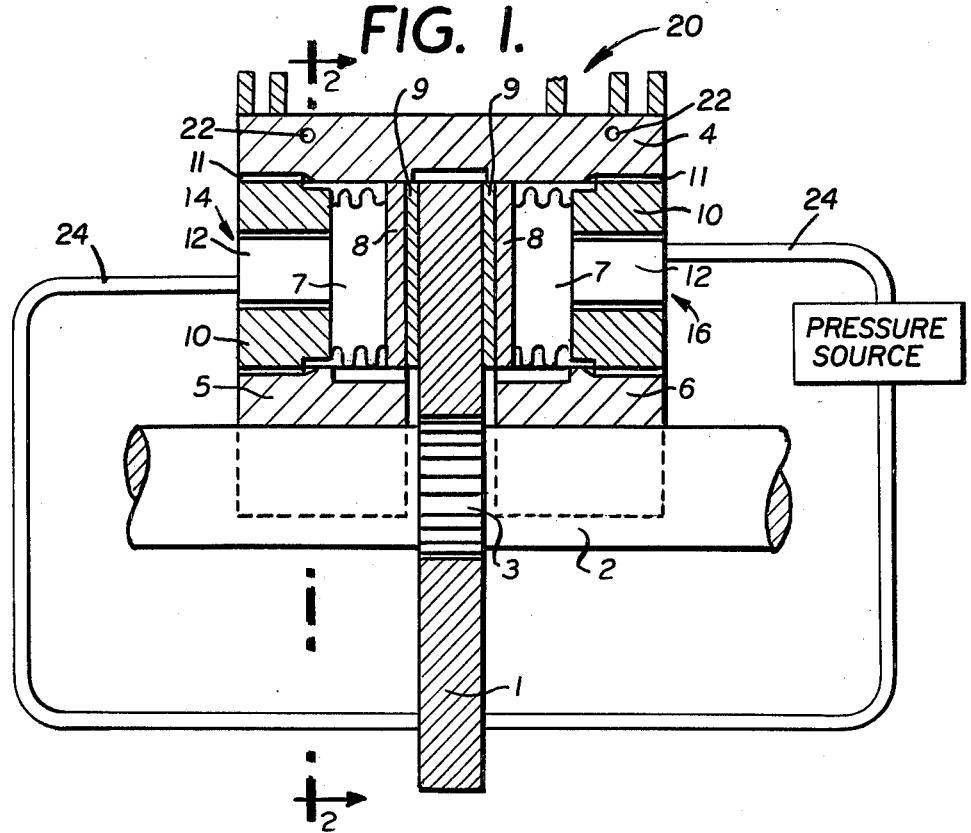
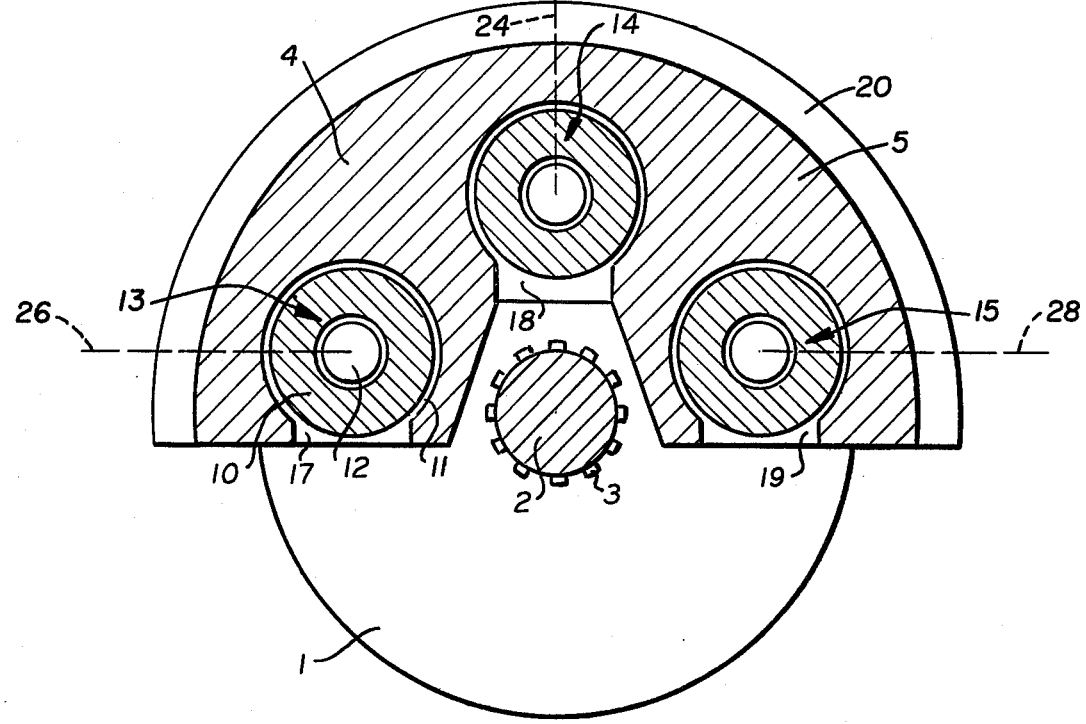

DISC BRAKE ACTUATOR

BACKGROUND OF THE INVENTION

Field of the Invention

The present invention relates to disc brakes.

The Prior Art

Prior art disc brakes known to applicant contain several moving parts with gaskets or seals connected to these moving parts making it difficult to produce and maintain such prior art disc brakes. The disc brake of the present invention contains fewer moving parts than such prior art disc brakes in that there are no gaskets or seals connected to the moving parts thereof, is simpler to produce and maintain and disposes of heat better than such prior art disc brakes, such as the type which include pressure pistons in cylinders where rubber seals are employed.

SUMMARY OF THE INVENTION

A disc brake which includes a disc mounted on a rotating shaft and a fixed clamp which carries brake elements which may be moved to and from the disc by controlled pneumatic or hydraulic pressure agents. The brake elements are in contact with a pressure head which may be soldered, welded or glued to one end of a self-supporting spring pipe which is directly connected to the clamp at the opposite end of the pipe by means of a suitable flange. The spring pipe forms the final link between the pressure system and the brake elements.

The clamp may be made of two separate shields which are placed in opposing positions on each side of the disc and are provided with at least one spring pipe in communication with the pressure system. Preferably, all spring pipes are connected to a common pressure system with the clamps and shields having openings to expose the spring pipes. Each opposed pair of spring pipes is preferably identically positioned in the shields and is connected to a separate common pressure system. The clamps and shields preferably carry cooling ribs and are provided with channels for circulating coolant therethrough. In addition, the pressure heads are preferably provided with a friction coating.

BRIEF DESCRIPTION OF THE DRAWINGS

FIG. 1 is a front elevation sectional view of a disc brake in accordance with the present invention; and FIG. 2 is a side elevation sectional view taken along line 2—2 of FIG. 1 of a disc brake in accordance with the present invention.

DETAILED DESCRIPTION OF THE PREFERRED EMBODIMENTS

The invention will be explained in detail in conjunction with the drawing which in FIG. 1 and FIG. 2 shows two different sections through one of many possible embodiments of the invention.

The brake includes a known disc 1 mounted on a shaft 2 with the help of teeth 3. The shaft 2 and disc 1 can be incorporated in cranes, centrifuges, vehicle, etc. The non-rotating parts of the brake are a strong clamp 4 composed of two shields 5 and 6 on each side of the disc, respectively, in mutually opposed relationship. Each shield 5, 6 carries at least one combination of a spring pipe 7, which at one end is furnished with a pressure head 8 and a friction coating 9, which in a non-activated condition maintains a predetermined clearance from the disc 1. The spring pipe 7 has at its other end a base flange 10 with a thread 11 to secure the combination in the shields 5, 6, as well as a central channel 12 with thread to secure a pressure pipe or hose 24,26,28 for a pneumatic or hydraulic pressure agent which is controlled from conventional sources. The clamp 4 is fastened to the stationary surroundings of the disc in a conventional manner.

In the drawing, the embodiment of the invention includes three pairs of brake combinations 7–12 in shields 5, 6, i.e., the visible combinations 13, 14, 15 in shield 5. For example, the combination 16 in shield 6 defines an operative pair with combination 14 in shield 5. Each shield can carry openings 17, 18, 19 which expose parts of the spring pipes 7 in order to increase the removal of heat. The clamps 4 can also be furnished with conventional cooling ribs 20, or with conventional channels 22 for circulating coolant. If used on vehicles it can be advantageous that identically positioned brakes in the four clamps provided at each of the four wheels respectively, are combined in their separate pressure system. Thus, in the shown example there are provided three independent pairs of brake combinations at each wheel, which apart from being a novelty are achieved by extremely simple and inexpensive means.

The brake in accordance with the invention functions in such a manner that a pressurized fluid enters the spring pipe 7 and expands it axially, forcing the friction coating 9 against the disc 1. When the pressure fluid is not activated, the spring pipe 7 will be contracted and thus the friction coating 9 will be at a predetermined distance from the disc 1. The brake may include more or less brake combinations 7–12, and the friction coating 9 may alternatively be mounted on the disc 1, leaving the pressure head 8 uncovered. The pressure head 8 may consist of metal, or a composite material including ceramics, in order to reduce heat transfer from the friction areas to the brake fluid inside the spring pipes 7.

It is to be understood that the above-described embodiment of the invention is merely illustrative of the principles thereof and that numerous modifications and embodiments of the invention may be derived within the spirit and scope therof.

What is claimed is:

1. In a disc brake assembly of the kind having a clamp housing fixedly mounted to a body which surrounds a rotatable member whose rotational movement is to be restrained in response to operation of said brake assembly, said rotatable member having a substantially planar rotatable disc fixedly joined thereto perpendicularly to the axis of rotation thereof, said disc being arranged to operatively rotate in the vicinity of said clamp, said clamp over-extending a portion of said disc and including at least one brake assembly operative to frictionally engage said disc in response to the application of pressurized fluid thereto, said brake assembly comprising:

an elastically deformable, self-supporting spring pipe arranged to be fixedly mounted only at one end thereof to said clamp for linearly expansible movement within an axially extending opening provided in said clamp, said opening in said clamp being disposed so as to enable said spring pipe to expand axially toward said rotatable disc while exposing an axially extending portion of said spring pipe to the exterior of said clamp for enabling outside air to operatively flow past said spring pipe for providing cooling within said clamp by the removal of heat therefrom;

a pressure head fixedly joined to and operatively sealing the other end of said spring pipe and slidable in said opening;

a frictional coating disposed between said pressure head and said disc brake; and means connected to said one end of said spring pipe for communicating fluid pressure from an outside source to said spring pipe to produce said expansible movement wherein said pressure head forcibly bears against said frictional coating and said disc to retard the movement of said disc in response to said fluid pressure when said brake assembly is operated, and said spring pipe maintains a predetermined clearance between said pressure head and said disc to permit said disc to move freely in the vicinity of said housing when said brake assembly is not operated, whereby friction temperatures normally present within said brake assembly can be decreased.

2. An assembly in accordance with claim 1 wherein said clamp has two shield portions each over-extending corresponding portions of said disc on opposite sides thereof, respectively, each of said shield portions including at least one of said brake assemblies mounted for operation therein.

3. An assembly in accordance with claim 2 wherein said fluid pressure communicating means is connected to each of said brake assemblies included in said shield portions.

4. An assembly in accordance with claim 2 wherein each of said shield portions includes a predetermined number of said brake assemblies defining corresponding pairs of mutually opposably disposed pairs of said brake assemblies, each said opposed pair of brake assemblies connected to a single one of said fluid pressure communicating means.

5. An assembly in accordance with claim 2 wherein said clamp includes cooling ribs to allow outside air to operatively flow past said housing and remove heat therefrom.

6. An assembly in accordance with claim 2 wherein said clamp includes channels for circulating coolants therethrough to operatively remove heat from said clamp.

7. An assembly in accordance with claim 1 wherein said frictional coating is fixedly secured to said pressure head.

8. An assembly in accordance with claim 1 wherein said frictional coating is fixedly secured to said disc.

* * * * *